(No Model.)

G. COX.
Machine for the Manufacture of Wadding or Batting from Waste Products.

No. 242,890. Patented June 14, 1881.

Witnesses
Frank P. Kinsey
Frank Schwarz

Inventor
George Cox
pr Thomas P. Kinsey
Atty

UNITED STATES PATENT OFFICE.

GEORGE COX, OF READING, PENNSYLVANIA.

MACHINE FOR THE MANUFACTURE OF WADDING OR BATTING FROM WASTE PRODUCTS.

SPECIFICATION forming part of Letters Patent No. 242,890, dated June 14, 1881.

Application filed October 6, 1880. (No model.)

*To all whom it may concern:*

Be it known that I, GEORGE COX, of the city of Reading, county of Berks, State of Pennsylvania, have invented a new and useful Improvement in Machines for the Manufacture of Wadding or Batting from Waste Produc's, of which the following is a specification.

This improvement relates more particularly to the reworking of old cotton comfortables and similar materials, with or without an admixture of short-staple cotton, into a merchantable wadding of various widths and thickness.

Figure 1:
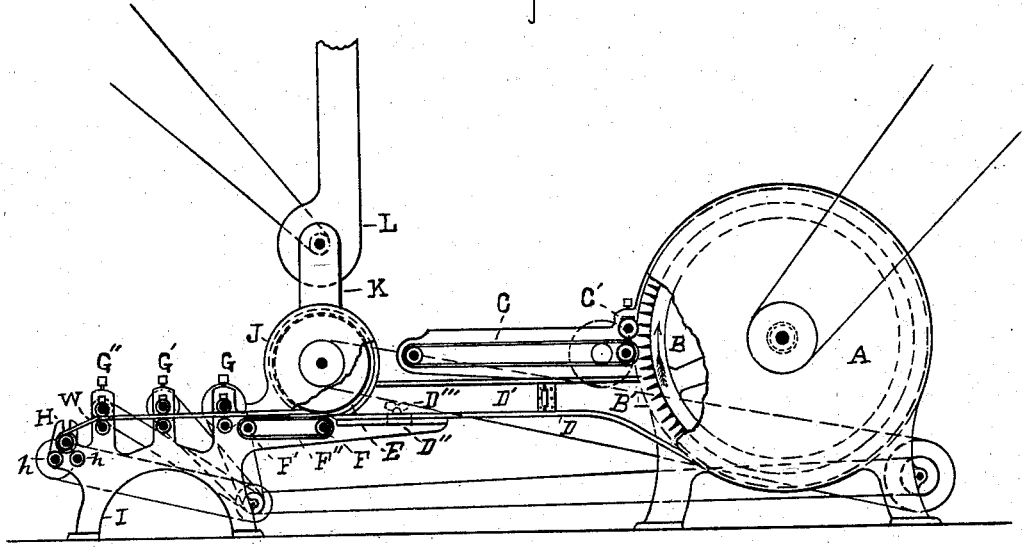
Figure 2:
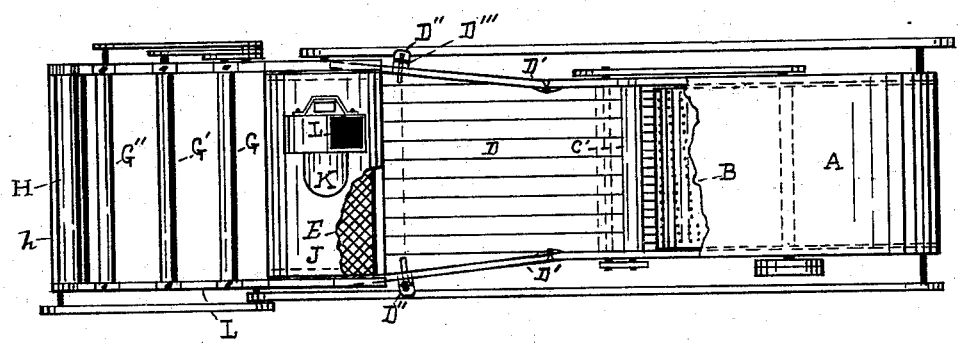

Referring to the drawings, in which similar letters refer to similar parts, Figure 1 is a side elevation of the machine; Fig. 2, a plan of the same, with the feed-apron of the shoddy-picker machine removed, so as to show the adjustable trough or chute for carrying the prepared material to the wadding-web machine.

A is a shoddy-picker machine, preferably of the Kitson make, having a picker-cylinder, B, armed with a series of steel teeth closely covering its periphery, an endless feeding-apron, C, feed-rolls C', and discharge-opening B', all being arranged and operating in the usual manner.

D is the discharge trough or chute, which is a covered passage from the picker to the revolving screen E of the wadding-web machine.

D' represents the sides of the chute, which are hinged at about one-third of their length, and provided with slotted quadrants D'' and pinching-screws D''', which permit of the expansion and contraction of the mouth of the chute where it discharges against the revolving screen E.

I represents the frame of the wadding-web machine, which may be of cast-iron; F and F', carrying-rollers, and F'' an endless apron running on the same.

G G' G'' are a series of three or more sets of condensing and extension rollers mounted in the frame I, the lower rolls level with the face of the endless apron F''', and between which sets of rolls the web of wadding or batting, as formed on the screen E, is passed. These several sets of rollers are by belt or gears revolved with a suitable speed ratio relative to each other to produce more or less extension of the web between each set of rolls, governed by the weight per dozen packages to be given to the product.

H is a roller mounted, as usual, upon two friction-rollers, *h h*, upon which the web is received, and when filled is transferred to the sizing-machine, an empty roller supplying its place in the web-machine.

W represents the course of the web through the machine. It will be seen that the endless apron F'' is merely for the purpose of supporting the web between the condensing-rollers G and the screen E.

J is a case partially surrounding the screen E, and having a dust-flue, K, in which is placed an exhausting-fan, L, the latter for the purpose of carrying away the dust produced by the operation of the machine.

I make no special preparation of the material, and the machine furnishes a web of wadding in all respects similar to that formed on a carding-machine working raw material.

I am aware that it is not new to disintegrate, shred, and tear apart for the purpose of reconversion old comfortables and equivalent materials, forming what is termed "shoddy," and the use of such product to form, with size, a base upon which a better article or short-stapled cotton was flaked, *vide* Patent No. 140,184, June 24, 1873, Andrew Chambers, wadding and machines for its manufacture; and, also, that wadding has been manufactured by the use of two machines—a lapper and picker—placed upon the same floor and arranged with their discharge ends in line with and toward each other, each machine being fed independently, and delivering its manufactured product at a point where the two machines coalesced, the product of one of the machines being sized previous to contact and then superimposed upon the unsized lap, the combined laps passing through a set of pressure-rolls to complete the process. (See Bloodgood's patent, No. 145,615, December 16, 1873, for machinery for making batting.)

I am also aware that suction-fans in connection with receiving-cylinders in cotton machinery is old, (see patent of Pilson's, No. 59,259, October 30, 1866, carding-pickers,) and therefore do not broadly claim the same.

I will now describe the operation of the machine, premising that it is designed to be applied to any of the shoddy or picker machines.

I prefer, however, a Kitson machine. The wadding-web machine is placed upon the same floor with the shoddy-picker, with its receiving-trough D (which is also the discharge-trough of the shoddy-picker) connected to the discharge-opening B' of the picker A. The various rolls, screen, &c., of the wadding-machine are driven from a counter-shaft on the rear frame of the same by belt or gear, as may be most convenient, or may be driven from a shaft overhead. The old (or raw) materials to be operated on are placed upon the endless apron C and introduced into the shoddy-picker A by the feeding-roller C', which firmly holds the article while being separated or shredded by the hatcheling-teeth of the cylinder B. The fibers so loosened are carried around the interior of the case, on the periphery of the cylinder B, until the discharge-opening B' is reached, when they leave the picker-teeth, and are by centrifugal force driven through the trough D against the revolving screen E. The screen being partially exhausted by the action of the fan L in the flue K, the fibers adhere with sufficient tenacity to pass between the screen E and endless apron F'' beneath, while any dirt or dust driven through the mesh of the screen is drawn up and discharged through the flue K by the fan L. The web as it passes under the screen is guided between the first set of rolls G and next through the rollers G' G'', being finally received upon the roller H, which completes the operation.

By this improvement in the machinery for the manufacture of wadding or batting from refuse materials or short-stapled fibers or raw cotton all carding-machines and lappers, with their expensive clothing, are dispensed with, and the size of building necessary to conduct the business is proportionately decreased. Labor is also correspondingly reduced. Any of the ordinary sizing-machines may be put in connection with the wadding or batting web machine and a continuous web produced, being carried from the web-machine through the sizing-machine, and finally through the drying-room, and out of the same under a cutter, which would shear it to the proper lengths for the market. A simple adjustment of the sides D' of the chute D by means of the quadrants D'' and screws D''' controls the width of the web formed upon the cylinder E.

Having described my improvement, its operation, and adaptation, I claim as follows:

1. The combination, with a wadding-web machine, I, and a shoddy-picker machine, A, of the chute D, provided with adjustable wings D', for connecting the two, substantially as shown, and for the purpose described.

2. The chute D of a shoddy-picker machine, A, having its discharge end provided with adjustable wings D', quadrants D'', ears and pinching-screws D''', whereby the wings may be set to expand or contract the discharge-opening, substantially as shown, and for the purpose described.

Signed at Reading city, county of Berks, State of Pennsylvania.

GEORGE COX.

Witnesses:
JOHN B. GRISSINGER,
JON. F. W. DEININGER.